(12) United States Patent
Callon et al.

(10) Patent No.: US 6,999,459 B1
(45) Date of Patent: Feb. 14, 2006

(54) SYSTEM AND METHOD FOR FACILITATING RECOVERY FROM COMMUNICATION LINK FAILURES IN A DIGITAL DATA NETWORK

(75) Inventors: Ross W. Callon, Westford, MA (US); Thierry Maison, Franklin, MA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/113,491

(22) Filed: Jul. 10, 1998

(51) Int. Cl.
*H04L 12/56* (2006.01)
(52) U.S. Cl. .................................. 370/400; 370/216
(58) Field of Classification Search ................ 370/216, 370/217, 218, 219, 220, 221, 222, 242, 245, 370/248, 460, 225, 228, 400, 395.1, 396, 370/409, 428
See application file for complete search history.

(56) References Cited

U.S. PATENT DOCUMENTS

| | | | | |
|---|---|---|---|---|
| 5,016,243 A | * | 5/1991 | Fite, Jr. ..................... 370/16 |
| 5,253,248 A | * | 10/1993 | Dravida et al. ............. 370/228 |
| 5,475,813 A | | 12/1995 | Cieslak et al. ......... 395/182.02 |
| 5,764,624 A | * | 6/1998 | Endo et al. ................. 370/218 |
| 5,781,529 A | * | 7/1998 | Liang et al. ................ 370/218 |
| 5,873,071 A | * | 2/1999 | Ferstenberg et al. .......... 705/37 |
| 6,011,780 A | * | 1/2000 | Vaman et al. ............... 370/237 |
| 6,031,817 A | * | 2/2000 | Moy ......................... 370/216 |
| 6,151,319 A | * | 11/2000 | Dommety et al. ...... 370/395.52 |
| 6,163,525 A | * | 12/2000 | Bentall et al. .............. 370/227 |
| 6,229,810 B1 | * | 5/2001 | Gerszberg et al. ........... 370/401 |
| 6,272,107 B1 | * | 8/2001 | Rochberger et al. ........ 370/216 |
| 6,765,908 B1 | * | 7/2004 | Chen ......................... 370/392 |

OTHER PUBLICATIONS

Knight, et al., "Virtual Router Redundancy Protocol," 1998, pp. 1-27.
Anderson, et al., "Virtual Path Group Protection Switching—A Method for Fast ATM Network Survivability," Bell Labs Technical Journal, Spring 1987, pp. 213-233.
"Synchronous Optical Network (SONET) Automatic Protection Switching", American National Standard for Telecommunications.
Loh, Peter, K. "Heuristic Fault-Tolerant Routing Strategies for a Multiprocessor Network," Microprocessors and Microsystems, vol. 19, No. 10, Dec. 1995, pp. 591-597.

* cited by examiner

*Primary Examiner*—Man U. Phan
*Assistant Examiner*—Toan Nguyen
(74) *Attorney, Agent, or Firm*—Donald R. Boys; Central Coast Patent Agency, Inc.

(57) ABSTRACT

A network comprises a plurality of switching nodes interconnected by communication links for transferring digital packets. At least one switching node in the network pre-establishes a bypass virtual circuit through the network to bypass an element of the network, such as a switching node or a communication link, in the network. The bypass virtual circuit defines a path to another switching node in the network. The first switching node uses the bypass virtual circuit so constructed in forwarding of a packet in the event of a failure or other malfunction of the element if the first switching node would otherwise transfer the packet over that element.

31 Claims, 3 Drawing Sheets

SYSTEM AND METHOD FOR FACILITATING RECOVERY FROM COMMUNICATION LINK FAILURES IN A DIGITAL DATA NETWORK

FIELD OF THE INVENTION

The invention relates generally to the field of digital communications, and more particularly to systems and methods for facilitating recovery from communication link failures in a digital data network.

BACKGROUND OF THE INVENTION

Digital networks have been developed to facilitate the transfer of information, including data and programs, among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnection pattern can allow for a number of paths to be available through the network from each computer system or other device which may transmit information as a source device, to another computer system or other device, which is to receive the information as a destination device, so that if congestion develops in particular regions of the network, or if components of the network become inoperative, information can be routed around the congested or inoperative portion of the network.

Information transferred from a source device to a destination device is generally transferred in the form of fixed- or variable-length packets, which are received by a switching node over a communication link connected thereto, and transmitted over another communication link to facilitate transfer of the packet to the destination device or another switching node along a path to the destination device. Each packet typically includes address information, including a source address that identifies the particular device that generated the packet, and a destination address that identifies the particular device or devices to receive the packet.

Information transferred from a source device to a destination device is generally transferred in the form of fixed- or variable-length packets, which are transferred through the network in accordance with one of several general packet transfer methodologies. In one packet transfer methodology, termed a "connectionless" data transfer methodology, each information packet that is transmitted by a source device to a destination device includes, in addition to the information to be transferred, destination address information which identifies the particular device that is to receive the packet. Each switching node in the network is provided with a database that stores network topology information, which describes the entire topology of the network, and a routing table that provides, among other information, routing information identifying the path to be taken from the switching node to any other switching node in the network. When a switching node receives a packet that is to be transferred to a particular destination device, it (that is, the switching node) will use the routing table to identify a communication link over which the packet is to be transmitted.

In another "connection-oriented" packet transfer methodology, packets are transferred through the network's switching nodes over constructs which are generally termed "virtual circuits," "virtual connections," "switched paths," and the like (generally, "virtual circuits"). When a source device wishes to transfer information to a destination device, initially a preliminary operation will be performed to establish a virtual circuit over communication links defining a path from the source device, through one or more switching nodes to the destination device. In this methodology, each switching node that operates using the virtual circuit methodology includes a virtual circuit table that identifies, for each virtual circuit for which the switching node forms a path, the particular communication link over which the packet is to be transmitted. In addition, each switching node may also include a network topology database that stores network topology information, which may be used for transferring connectionless packets which may be used for a variety of purposes, including, for example, transferring network management information to respective switching nodes.

Several problems can arise if a communication link interconnecting two switching nodes fails or otherwise malfunctions. When that occurs, typically some time is required to provide information to all of the switching nodes in the network indicating that the communication link is no longer available. For some time after the failure or malfunction occurs, the network topology information as maintained by the various switching nodes will be inconsistent, in which case their routing determinations, or virtual circuit path establishment decisions will also be inconsistent. In addition, in a connection-oriented network, switching nodes may attempt to establish virtual circuits over the failed communication link. A number of undesirable consequences can arise if switching nodes in a network have inconsistent or incorrect routing information. For example, in a connectionless network, inconsistent or incorrect routing information can result in looping packets among a plurality of switching nodes in the network, loss of packets, as well as routing of packets over paths in the network which are not optimal. In a connection oriented network, inconsistent or incorrect routing information can result in inability to set up new virtual circuits and inability to repair virtual circuits which have failed.

SUMMARY OF THE INVENTION

The invention provides a new and improved system and method for facilitating recovery from failures of communication links in a digital data network.

In brief summary, the invention provides a network comprising a plurality of switching nodes interconnected by communication links for transferring digital packets. At least one switching node in the network pre-establishes a bypass virtual circuit through the network to bypass an element of the network, such as a switching node or a communication link, in the network. The bypass virtual circuit defines a path to another switching node in the network. The first switching node uses the bypass virtual circuit so constructed in forwarding of a packet in the event of a failure or other malfunction of the element if the first switching node would otherwise transfer the packet over that element. By providing and making use of such bypass virtual circuits, the switching nodes which are connected to an element which has failed or otherwise malfunctioned can avoid notifying the other switching nodes, thereby avoiding undesirable consequences that can occur if the routing information maintained by the switching nodes is inconsistent.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
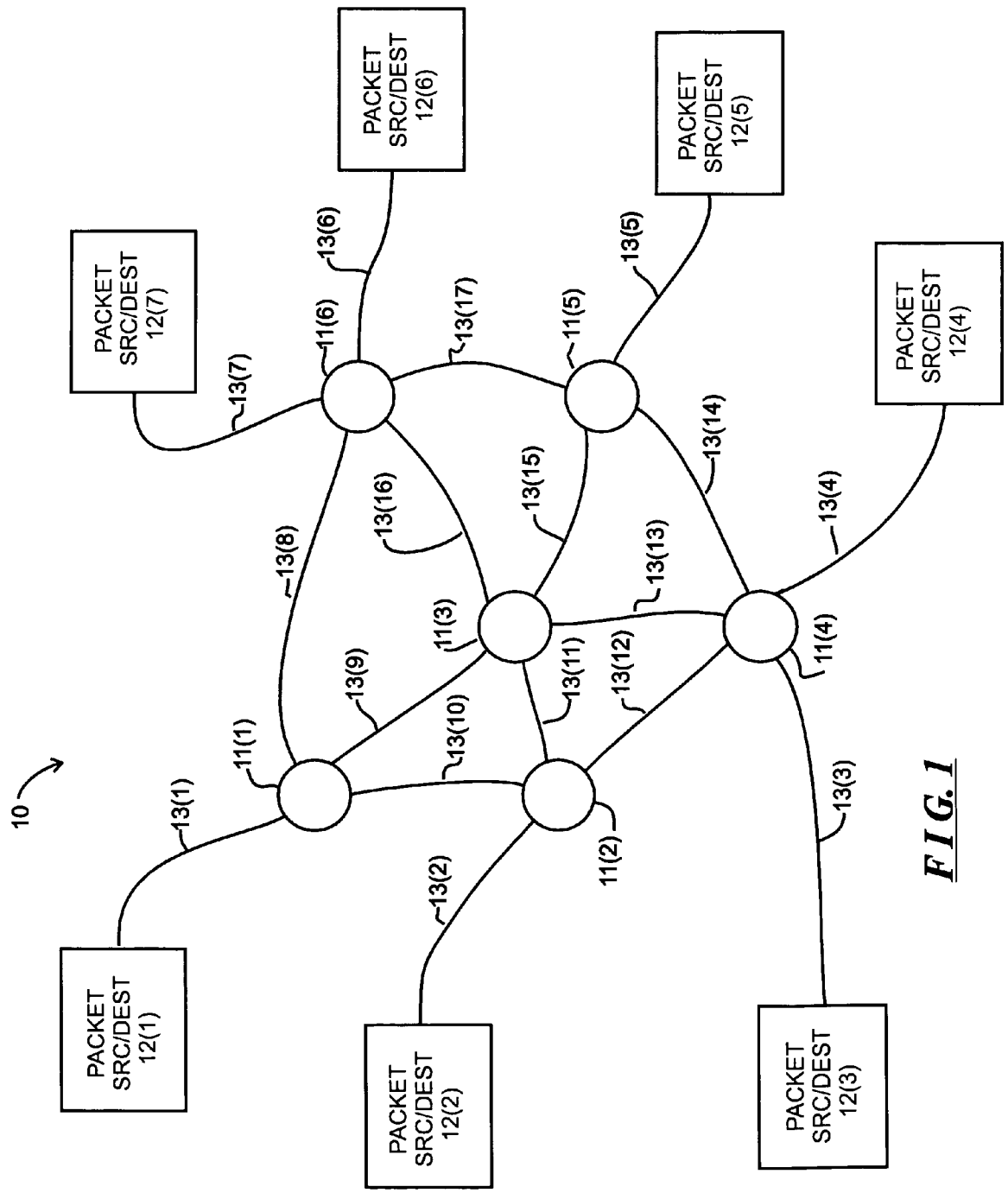
FIG. 1 schematically depicts a computer network including a facility for recovering from communication link failures, constructed in accordance with the invention.

FIG. 1 schematically depicts a computer network 10 including a facility for recovering from communication link failures constructed in accordance with the invention. The computer network 10 includes a plurality of switching nodes 11(1) through 11(N) (generally identified by reference numeral 11($n$)) for transferring signals representing data among a number of devices, which in FIG. 1 are represented by packet source/destination devices 12(1) through 12(M) (generally identified by reference numeral 12($m$)) in a wide area network ("WAN"). The switching nodes 11($n$) used in one embodiment of the invention may be similar to the switching node described in U.S. patent application Ser. No. 09/108,771, filed Jul. 2, 1998, in the names of Steven J. Schwartz, et al., entitled "System And Method For Switching Packets In A Network", assigned to the assignee of the present application and incorporated herein by reference. The packet source/destination devices 12($m$), as is conventional, include a particular device, such as a computer system or other device that stores, generates, processes or otherwise uses digital data, a local area network of such devices, or the like (not separately shown) to the wide area network 10. Each packet source/destination device 12($m$) is connected over a communication link, generally identified by reference numeral 13($p$), to a switching node 11($n$) to facilitate transmission of data thereto or the reception of data therefrom. The switching nodes 11($n$) are interconnected by communication links, also generally identified by reference numeral 13($p$) to facilitate the transfer of information among the respective switching nodes 11($n$). The communication links 13($p$) may utilize any convenient information transmission medium, including, for example, wires for carrying electrical signals, optical fiber links for carrying optical signals, and so forth. Each communication link 13($p$) is preferably bi-directional, allowing the switching nodes 11($n$) to transmit and receive signals among each other and with customer premises equipment 12($m$) connected thereto over the same link; depending on the particular type of medium selected for respective communication links 13($p$), multiple media may be provided for transferring signals in opposite directions thereby to provide the bidirectional link. In addition, each communication link 13($p$) depicted in FIG. 1 may comprise a plurality of physical uni- or bi-directional links to provide redundancy in the event of a failure in one of the links or transmitting or receiving circuitry associated therewith.

Data is transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used. In one embodiment, which will be described in connection with FIG. 2, a connectionless routing protocol is used, in particular, the well-known Internet protocol ("IP"). A second embodiment, in which a connection-oriented routing protocol, in which packets are transferred over virtual circuits, will further be described. In the connectionless routing protocol, the header portion typically includes address information including a source address identifying the particular source device 12($m$S) that generated the packet and a destination address identifying the particular destination device 12($m$D) that is to receive the packet. In the IP protocol, a packet may be of variable length and the header typically will also include length information to identify the length of the packet. The header also typically includes other information, including, for example, protocol identifier information that identifies the particular protocol that defines the structure of the packet. The data portion contains the data payload of the packet. The packet may also include, as part of the header portion, data portion or otherwise, error detection information that can be used to determine whether an error occurred in transferring the packet.

A source device 12($m$S), after generating a packet for transfer to a destination device 12($m$D), will provide the packet to the switching node 11($n$) connected thereto. The switching node 11($n$) will use the destination address in the packet to attempt to identify a "route," which associates a destination address with one of the communication links 13($p$) connected thereto over which it is to transfer the packet to forward it (that is, the packet) to either the destination device 12($m$D), if the switching node 11($n$) is connected to the destination device 12($m$D), or to another switching node 11($n$') (n'≠n) along a path to the destination device 12($m$D). Each switching node maintains a network topology database, which identifies the switching nodes 11($n$) comprising the network, the communication links 13($p$) which interconnect them, and other information such as communications "cost" information associated with each communication link 13($p$), which they (that is, the switching nodes 11($n$)) use to determine the route information. Several methodologies are known for generating route information from network topology information in the network topology database, including the well-known OSPF ("open shortest path first") methodology. If the switching node can identify a route for the received packet, it will forward the packet over the communication link identified by the route. Each switching node 11($n$'), 11($n$"), . . . , which receives the packet will perform a similar operation. If all of the switching nodes have respective routes for the destination address, the packet will eventually arrive at the destination device 12($m$D).

The invention provides an arrangement, which will be described in connection with the network 10 depicted in FIG. 1, for facilitating recovering from failures or other malfunctions in connection with a communication link 13($p$) interconnecting two switching nodes 11($n$). A switching node 11($n$) and a device 12($m$) may determine that a failure or other malfunction has occurred using any of a number of conventional arrangements. For example, elements connected to a particular communication link 13($p$) can verify that it has not failed or otherwise malfunctioned by, for example, periodically transferring link status packets thereover, particularly if other packets are not being transferred thereover. In that case, if a switching node 11($n$) or device 12($m$) does not receive a link status packet over a communication link 13($p$) within a predetermined window of time following receipt of a previous link status packet, and if other types of packets have not been received in the meantime, the respective switching node 11($n$) or device 12($m$) can determine that the communication link 13($p$) has failed or otherwise malfunctioned. If a communication link 13(*p*) is a uni-directional communication link, in which packets are transferred from one switching node 11(*n*) to another switching node 11(*n*')(n'≠n), but not from switching node 11(*n*') to switching node 11(*n*), link status packets can still be used to verify that the communication link 13(*p*) has not failed or otherwise malfunctioned. In that case, the switching node 11(*n*) can transfer link status packets over the communication link 13(*p*), and the switching node 11(*n*') can either notify the switching node 11(*n*) that it (that is, switching node 11 (*n*')) has, or has not, received the link status packet over another path therebetween through the network, which path may extend through another switching node 11(*n*")(n"≠n',n). Other mechanisms by which the switching nodes and devices can determine whether a communication link 13(*p*) is operating properly, or whether it has failed or otherwise malfunctioned, including, for example, mechanisms include detecting the loss of physical signal on the communication link or mechanisms similar to those which are implemented in a network constructed using the well-known SONET, SDH and TDM protocols, will be apparent to those skilled in the art.

As noted above, The invention provides an arrangement for facilitating recovering from failures or other malfunctions in connection with a communication link 13(*p*) interconnecting two switching nodes 11(*n*). In the first embodiment, in which the network 10 transfers packets in a connectionless manner, each switching node 11(*n*) establishes, for each communication link 13(*p*) which interconnects it (that is, the switching node 11(*n*)) and another switching node 11(*n*'), a permanent, pre-established special-purpose "bypass" virtual circuit which bypasses the communication link, over which the switching node 11(*n*) can transfer packets in the event of a failure or other malfunction in connection with the communication link 13(*p*). Thus, if a communication link 13(*p*) fails or otherwise malfunctions, and if the switching node 11(*n*) receives a packet which its routing table indicates would be properly transferred over that communication link 13(*p*), instead of discarding the packet or routing it in a connectionless manner to another switching node 11(*n*") (which may result in the other switching node 11(*n*') returning the packet to the switching node 11(*n*)), the switching node 11(*n*) embeds the packet in one or more virtual circuit packets and transfers it over the pre-established bypass virtual circuit to the switching node 11(*n*'). When the switching node 11(*n*') receives the virtual circuit packet(s) from the switching node 11(*n*) over the bypass virtual circuit, it will extract the original packet from the virtual circuit packet(s) and forward it toward the destination device 12(*m*D) in the usual manner.

As a specific illustration, suppose the switching node 11(1) receives a packet (from, for example, the device 12(1)), for transfer to the device 12(2). Suppose further that the routing table of switching node 11(1) indicates that packets to be transferred to device 12(2) are to be transferred thereby (that is, by switching node 11(1)) over communication link 13(10) to switching node 11(2)), but that communication link 13(10) has failed or otherwise malfunctioned. Finally, suppose that the switching nodes 11(1) and 11(2) have established a bypass virtual circuit through switching node 11(3), including communication links 13(9) and 13(11). In that case, the switching node 11(1), after receiving the packet for transfer to the device 12(2), will embed the packet in one or more virtual circuit packets for transfer over the bypass virtual circuit, and will transfer the virtual circuit packets over the communication link 13(9) to switching node 11(3). The switching node 11(3), as it receives the virtual circuit packets, will forward them to the switching node 11(2) over communication link 13(11). The switching node 11(2) will reconstruct the original packet from the virtual circuit packet(s) either as it receives the virtual circuit packets or after it has received all of them. In any case, after the switching node 11(2) has constructed the original packet, it will forward the packet to its intended destination, in this case device 12(2).

Similar operations can occur in connection with, for example, packets received by switching node 11(1) for transfer to device 12(3) or 12(4), connected to switching node 11(4), if its (that is, switching node 11(1)'s) routing table indicates that such packets are to be transferred over communication link 13(10) and through switching node 11(2), and if communication link 13(10) has failed or otherwise malfunctioned. Thus, if the switching node 11(1) receives a packet for transfer to device 12(3), and if communication link 13(10) has failed or otherwise malfunctioned, the switching node 11 (1), after receiving the packet, will embed the packet in one or more virtual circuit packets for transfer over the bypass virtual circuit, and will transfer the virtual circuit packets over the communication link 13(9) to switching node 11 (3). The switching node 11(3), as it receives the virtual circuit packets, will forward them to the switching node 11(2) over communication link 13(11). The switching node 11(2) will reconstruct the original packet from the virtual circuit packet(s) either as it receives the virtual circuit packets or after it has received all of them. In any case, after the switching node 11(2) has constructed the original packet, it will forward the packet to switching node 11(4). The switching node 11 (4), after it receives the original packet, can forward it to the device 12(4) as destination.

Bypass virtual circuits can be established in network 10 for each communication link 13(*p*) in a similar manner. If a communication link 13(*p*) is a unidirectional communication link, the respective bypass virtual circuit therefor can be a unidirectional bypass virtual circuit. On the other hand, if a communication link 13(*p*) is a bidirectional communication link, the respective bypass virtual circuit therefor can be a bi-directional bypass virtual circuit, or alternatively the switching nodes 11(*n*), 11(*n*') can establish two uni-directional bypass virtual circuits therefor. The virtual circuits can be established to transfer virtual circuit packets in accordance with any connection-oriented packet transfer methodology, such as MPLS, ATM, or the like.

As noted above, each switching node 11(*n*) includes a network topology database, from which it determines route information to be used in routing packets over the communication links 13(*p*) connected thereto. The switching nodes 11(*n*) can establish and update information in the network topology database in a conventional manner by broadcasting link state advertising messages through the network 10. Each link state advertising message identifies the switching node 11(*n*), the communication links 13(*p*) connected thereto, and the communication cost information that is applicable to each of the communication links 13(*p*). After a switching node 11(*n*) receives a link state advertising message, it will determine whether the link state advertising message indicates that the network topology has changed sufficiently to warrant updating the route information which it maintains in its routing tables, and, if so, will update the route information. If a communication link 13(*p*) fails or otherwise malfunctions, if the switching nodes 11(*n*), 11(*n*') connected thereto broadcast link state advertising messages over the network so indicating, since the link state advertising messages will be received by the other switching nodes and processed at different times, their network topology databases and routing tables will generally be inconsistent with each other for at least some time following the determination that the communication link 13(p) has failed or otherwise malfunctioned. It will be appreciated that, by use of the bypass virtual circuits, the switching nodes 11(n), 11(n') may avoid the necessity of notifying the other switching nodes that the communication link has failed or otherwise malfunctioned. Alternatively, the switching nodes 11(n), 11(n') may provide a notification that the communication cost related to transfers over the virtual circuit has increased, particularly if the total communication cost related to the communication links forming the path of the bypass virtual circuit is higher than that for the communication link which has failed or otherwise malfunctioned and is bypassed by the respective bypass virtual circuit.

The embodiment described above allows the network to operate correctly even in the event of a failure of a communication link 13(p), and therefore eliminates the need to immediately notify all of the switching nodes 11(n) in the event of a link failure. Such a notification ensures that the network will relatively rapidly converge on correct routes which take the link failure into account. However, in a connectionless network using conventional prior art routing methods, such notification also ensures that there will be a short period of time during which the switching nodes 11(n) have an inconsistent view of the topology of the network, potentially resulting in looping packets, lost packets, or other network disruption. However, in some cases it might be desirable to provide a notification to the other switching nodes that a communication link has failed or otherwise malfunctioned so that the other switching nodes can update their network topology databases and route information accordingly. In that case, the switching nodes 11(n), 11(n') can, for example, (i) notify a network manager, who can determine the cause of the failure or malfunction, and whether recovery will require enough time to warrant updating the network topology databases and route information generally throughout the network. If the network manager determines that the recovery can be performed quickly enough that updates are not warranted, he or she may merely proceed with the recovery, without enabling updates to the network topology databases or route information. On the other hand, if the network manager determines that the recovery can not be performed quickly enough that updates are not warranted, he or she may, in addition to proceeding with the recovery, enable updates to the network topology databases of the respective switching nodes; in that case, if the switching nodes can determine whether the update warrants updating the route information in their respective routing tables and, if so, perform the updates.

(ii) generate link state advertising messages for broadcast through the network, but specify that the switching nodes only update the route information in their routing tables at a predetermined point in time. The predetermined point in time may be selected so as to guarantee that the network 10 is not busy. Since all of the switching nodes will apply the update at the predetermined point in time, their routing tables will not be inconsistent.

(iii) initially broadcast link state advertising messages which do not indicate that the communication link has failed or otherwise malfunctioned, but instead that the communication cost associated therewith has increased by a selected small amount. After an amount of time, which is selected to be at least the amount of time required for the last switching node to receive the link state advertising message, the switching nodes 11(n), 11(n') will again broadcast link state advertising messages for which the communication cost associated with the communication link is similarly increased. As the other switching nodes receive the link state advertising messages, they will update their routing tables as warranted by the increased communication cost for the respective communication link. These operations will be repeated through a plurality of iterations until, eventually, the communication cost has reached a level such that no network traffic is computed (using the OSPF methodology, as described above) to use that communication link. At that point, the switching nodes 11(n), 11(n') can broadcast link state advertising messages indicating that the communication link has failed.

It will be appreciated that, after a communication link 13(p) has failed or otherwise malfunctioned, and the bypass virtual circuit used in substitution therefor, the communication cost associated with the communication link 13(p), and with the communication links 13(p'), 13(p") (p', p"≠p) which are used for the bypass virtual circuit, can be advertised in the link state advertising messages as having increased, since there will be increased congestion associated therewith. The other switching nodes can use the increased communication cost as warranted in updating their route information, which can help balance the traffic across communication links in the network. After the communication link 13(p) has been repaired, the link state advertising messages can indicate a corresponding reduction in communication cost associated therewith and with the communication links 13(p'), 13(p") used for the bypass virtual circuit, and the other switching nodes can use the decreased communication cost as warranted in updating their route information, which can restore the network to its previous traffic condition.

If there are widespread failures or more than one simultaneous failure, causing a link to fail at the same time that the associated bypass virtual circuit or circuits, it will generally be desirable to provide notifications to the various switching nodes 11(n) using conventional routing protocol mechanisms.

Figure 2:
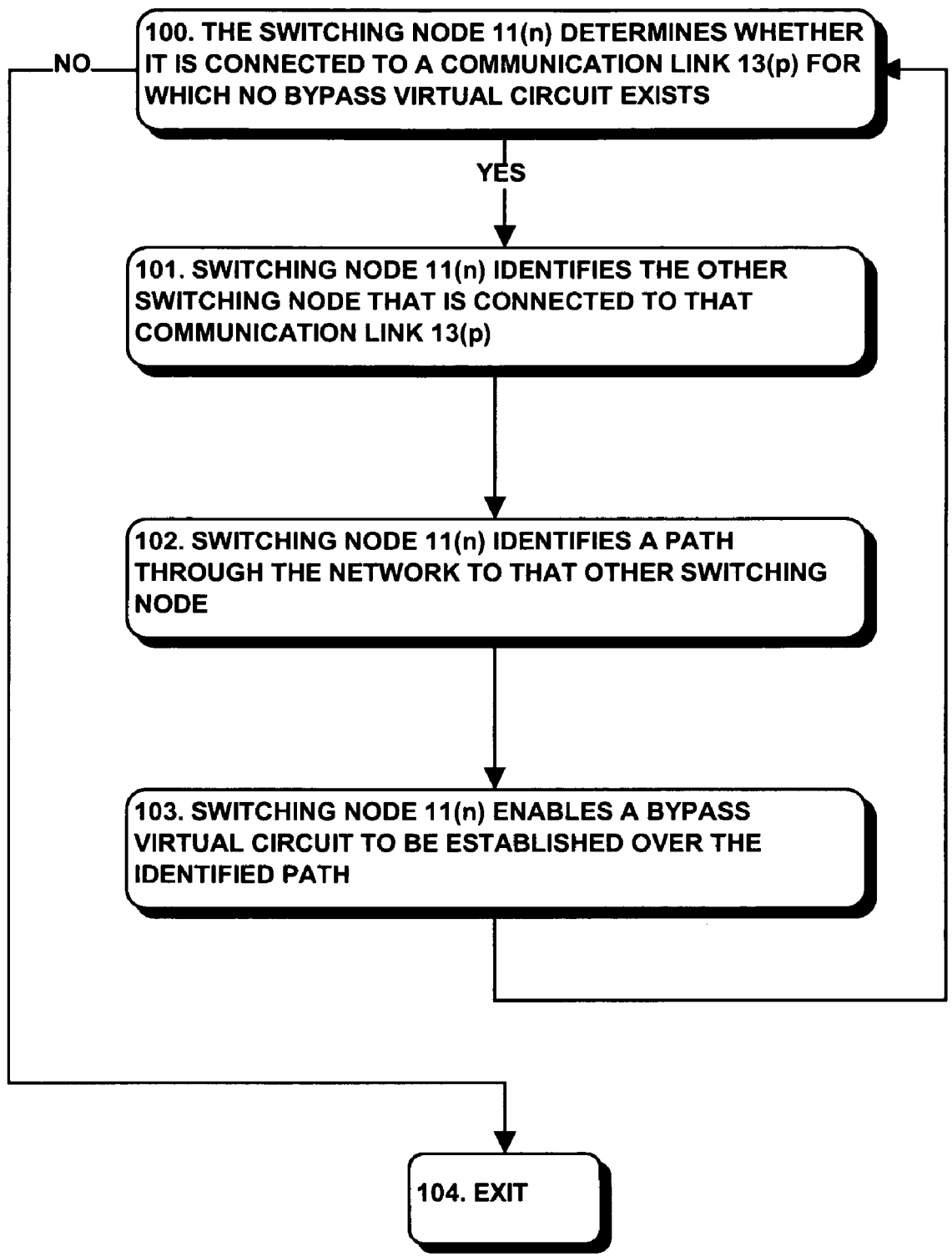
FIG. 2 is a flowchart depicting operations performed by switching nodes in connection with recovering from communication link failures.
Figure 2A:
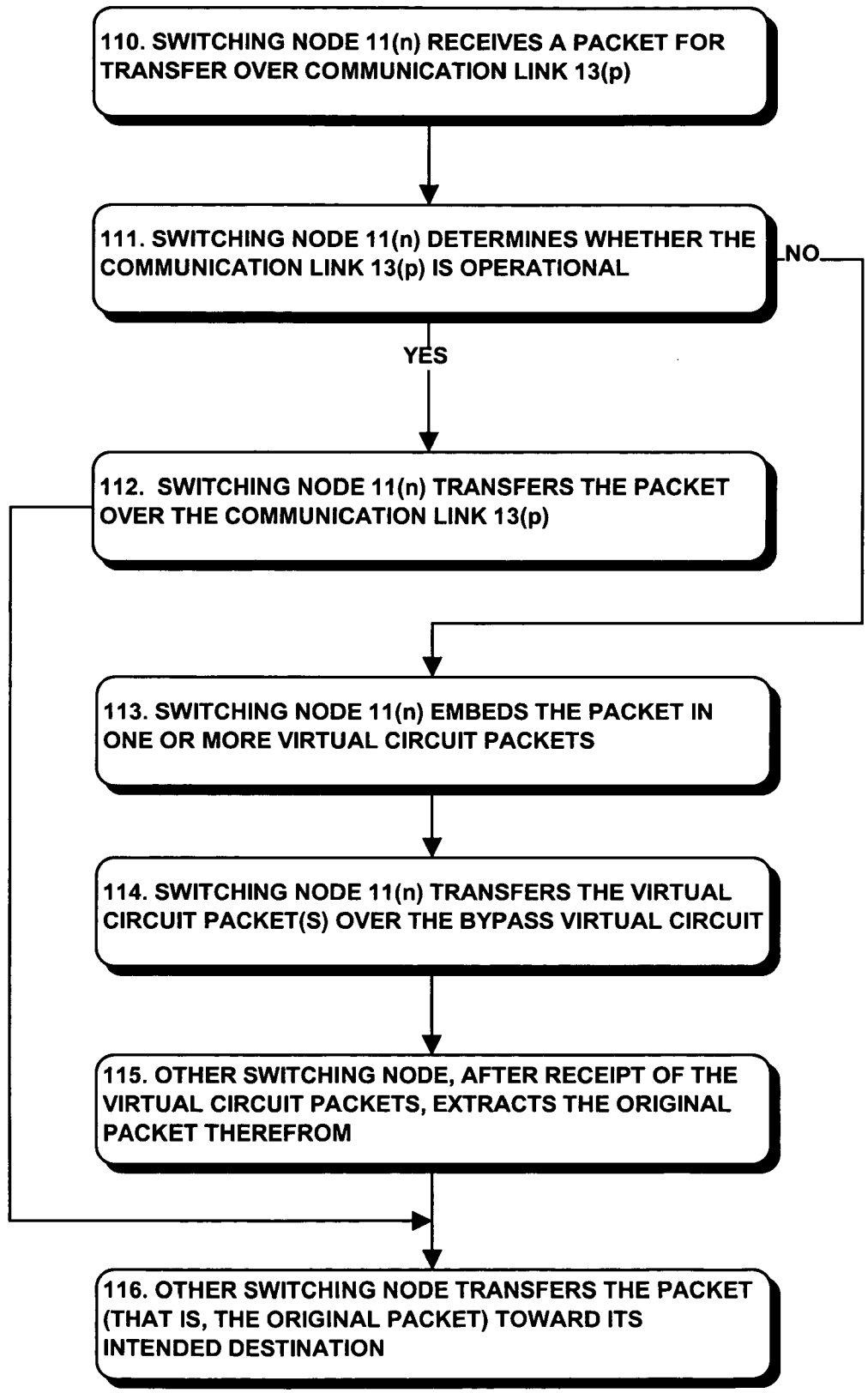

With this background, operations performed by a switching node 11(n) in connection with this aspect of the invention will be described in connection with FIG. 2. With reference to FIG. 2, the switching node 11(n) performs a plurality of operations to establish bypass virtual circuits for each of the communication links 13(p) interconnecting it (that is, the switching node 11(n)) and other switching nodes 11(n'), 11(n"), . . . , in the network 10. In that operation, the switching node 11(n) will determine whether it is connected to a communication link 13(p) for which no bypass virtual circuit exists (step 100). If the switching node 11(n) makes a positive determination in step 100, it will identify the other switching node 11(n'), 11(n"), . . . that is connected to that communication link 13(p) (step 101), and identify a path through the network to that other switching node (step 102). The switching node 11(n) can use any conventional methodology for identifying a path through the network to the other switching node in step 102, including the OSPF methodology. After the switching node 11(n) has identified the path, it will enable the bypass virtual circuit to be established over the identified path (step 103). In that operation, any conventional virtual circuit establishment methodology can be used to establish the bypass virtual circuit. However, in connection therewith, at least the switching node 11(*n*) and the other switching node to which the bypass virtual circuit is being established will be aware that the virtual circuit is a bypass virtual circuit, so that they will, when a packet is received for transfer over the communication link 13(*p*), if the communication link has failed or otherwise malfunctioned, instead of transferring the packet over the communication link 13(*p*), embed the packet in one or more virtual circuit packets, transfer the virtual circuit packets over the bypass virtual circuit, and extract the original packet therefrom for transfer to the destination. In any case, following step 103, the switching node 11(*n*) will return to step 100, and repeat steps 100 through 103 through one or more iterations until a bypass virtual circuit has been established for each communication link connected thereto, after which it can exit (step 104).

After the bypass virtual circuit has been established for a communication link 13(*p*), the switching node 11(*n*) and other switching node connected thereto can use it in the case of a failure or other malfunction of the communication link 13(*p*). In that connection, when the switching node 11(*n*) receives a packet for transfer over the communication link 13(*p*) (step 110), it will initially determine whether the communication link 13(*p*) is operational (step 111). If the switching node 11(*n*) makes a positive determination in step 111, it will transfer the packet over the communication link 13(*p*) (step 112). On the other hand, if the switching node 11(*n*) makes a negative determination in step 111, which will occur if the communication link 13(*p*) has failed or otherwise malfunctioned, it will embed the packet in one or more virtual circuit packets (step 113) and transfer it or them over the bypass virtual circuit (step 114). When the other switching node receives the virtual circuit packets, it will extract the original packet therefrom (step 115). Following step 112 or step 115, the other switching node will transfer the packet (that is, the original packet) toward its intended destination (step 116).

As noted above, in connection with a second embodiment, in which the network 10 transfers packets in a connection-oriented manner, packets are normally transferred through the network using constructs such as virtual circuits. In that embodiment, each packet, instead of providing a destination identifier identifying the actual destination for the packet, provides a virtual circuit identifier which the switching node that receives the packet uses to identify the communication link over which the packet is to be transferred, using information from a virtual circuit table. In any case, in the second embodiment, switching nodes 11(*n*) comprising the network 10 also establish bypass virtual circuits which they use if a communication link 13(*p*) fails or otherwise malfunctions, in connection with transfer of packets for virtual circuits for which the communication link 13(*p*) forms part of the path. However, in the case of the second embodiment, the switching nodes 11(*n*) establish either (i) a bypass virtual circuit for each virtual circuit for which the communication link forms part of the path, which will be used in connection with packets associated with the respective virtual circuit if the communication link 13(*p*) fails or otherwise malfunctions, or (ii) one or several virtual circuits over which virtual circuit packets associated with some subset of the virtual circuit(s) for which the communication link forms part of the path can be transformed, will be used in connection with packets associated with virtual circuit(s) in the respective subset, if the communication link fails or otherwise malfunctions.

It will be appreciated that item (ii) above will find utility primarily in connection with virtual circuit transfer methodologies which allow packets from multiple virtual circuits to be merged into a single virtual circuit for transfer. In connection with either item (i) or item (ii), it will be appreciated that the bypass virtual circuit established by one switching node 11(*n*) need not terminate at the switching node 11(*n'*) connected to the communication link, but instead may terminate at another switching node 11(*n"*) downstream thereof along the path for the virtual circuit, if, for example, the switching node 11(*n*) determines that that will enhance efficient transfer of packets along the virtual circuit.

In either case, when a switching node 11(*n*) receives a packet associated with a virtual circuit for which a communication link 13(*p*) which has failed or otherwise malfunctioned forms part of the path, it (that is, the switching node 11(*n*)); will transfer the packet over the bypass virtual circuit, in a manner similar to that described above in connection with the connectionless transfer methodology. Similarly, when the switching node which forms the destination end of the bypass virtual circuit receives a packet therefrom, it will resume transfer of the packet over the virtual circuit (that is, the virtual circuit whose path included the communication link 13(*p*) which had failed or otherwise malfunctioned).

The invention provides a number of advantages. In particular, the invention provides for the rapid recovery in connection with transfer of packets through a network in the event of a failure or other malfunction in connection with a communication links, while minimizing problems that can occur if the network topology information and routing information maintained by the respective switching nodes comprising the network is inconsistent.

It will be appreciated that numerous modifications may be made to the invention. For example, although the invention has been described as making use of virtual circuits to provide the mechanism for bypassing a communication link which has failed or otherwise malfunctioned, it will be appreciated that other arrangements, such as source routing, in which the switching node 11(*n*) connected to a communication link which has failed or otherwise malfunctioned determines the route to the other switching node 11(*n'*) through one or more other switching nodes. In that case, the switching node 11(*n*) would embed the packet in a source-routed packet for transfer to the other switching node 11(*n'*). The switching node 11(*n'*), when it receives the source-routed packet, extracts the original packet for transfer towards the destination.

In addition, it will be appreciated that any convenient virtual circuit transfer methodology can be used, including ATM, MPLS, etc., for use in connection with bypass virtual circuits.

In addition, although the invention has been described in connection with providing a bypass virtual circuit for use in the event of failure of a communication link 13(*p*), it will be appreciated that bypass virtual circuits can similarly be established to bypass other components, including, for example, a switching node, in the event of a failure or other malfunction of the switching node. For example, with reference to FIG. 1, if switching node 11(2) wishes to establish a bypass virtual circuit to be used in the event of a failure of switching node 11(3) for transfer of packets to switching node 11(6), it can establish a bypass virtual circuit to node 11(6) through switching node 11(1). Thus, if switching node 11(2) determines that switching node 11(3) has failed or otherwise malfunctioned, it will transfer packets to switching node 11(6) over that bypass virtual circuit as described above. Bypass virtual circuits for use in the event a switching node 11(n) fails or otherwise malfunctions may be established either instead of or in addition to the bypass virtual circuits established for use in the event of a failure or other malfunction of a communication link 13(p).

It should be noted that, in general it may be difficult to rapidly determine whether a communication link 13(p) or switching node 11(n) has failed or otherwise malfunctioned, particularly if such determination requires transfer of packets through other switching nodes. For example, with reference to FIG. 1, if switching node 11(2) detects a failure in connection with communication link 13(11), the switching node 11(2) will not be immediately able to determine whether the communication link 13(p) itself has failed or whether the switching node 11(3) connected thereto has failed. However, bypass virtual circuits can be set up to other nodes in the network which bypass multiple network components, such that the failure can be bypassed regardless of which if the network components has failed.

Furthermore, it will be appreciated that bypass virtual circuits can be established in a network for all, or any subset of communication links and/or switching nodes in the network.

In addition, it will be appreciated that the invention can be used in connection with networks carrying any type of digital data, including voice or video data, as well as data for use in digital processing.

In addition, although the switching nodes 11(n) have been described as being similar to the switching node described in the aforementioned Schwartz, et al., application, it will be appreciated that the invention may be used in connection with switching nodes of any structure or architecture.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to specific embodiments of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method of recovering from failures on a network having a plurality of nodes coupled by links over which data packets can be transferred between the nodes, each of the plurality of nodes storing information that associates links out of the node with destination nodes to which the data packets can be transferred such that the node can forward the data packets out of the node over a link to a next successive node toward an associated destination node, said method comprising:

for at least one of the nodes, generating and storing an alternate output route out of the node such that, in the event that the data packets to be transferred toward a destination node cannot be forwarded to the next successive node over the link associated with the destination node, the at least one of the nodes can forward the data packets over the alternate output route toward the destination node;

after generating and storing the alternate output route, if the data packets to be transferred toward a destination node cannot be forwarded to the next successive node over the link associated with the destination node, forwarding the data packets over the alternate output route toward the destination node, by embedding the data packets in virtual packets addressed for the alternate route; and after forwarding the data packets over the alternate output route toward the destination node, providing to other nodes on the network information that data cannot be transferred between the at least one of the nodes and the next successive node;

wherein the information that the data packets cannot be transferred between the at least one of the nodes and the next successive node includes a time at which nodes receiving the information should perform a recovery operation such that the recovery operations at the plurality of nodes on the network are synchronized.

2. The method of claim 1 wherein the alternate output route is a connectionless route.

3. The method of claim 1 wherein the alternate output route defines an association between the next successive node and an alternate link out of the at least one of the nodes such that the data packets intended to be forwarded to the next successive node can be forwarded over the alternate link.

4. The method of claim 1 wherein the alternate output route is a connection-oriented route.

5. The method of claim 1 wherein the alternate output route is a bypass path through the at least one node to bypass the next successive node.

6. The method of claim 1 wherein the alternate output route is a bypass path through the at least one node to bypass a failed link out of the at least one node.

7. The method of claim 1 wherein the alternate output route is a connection-oriented route.

8. The method of claim 1 wherein the alternate output route is a bypass path through the at least one node to bypass the next successive node.

9. The method of claim 1 wherein the alternate output route is a bypass path through the at least one node to bypass a failed link out of the at least one node.

10. The method of claim 1 wherein the data packets are forwarded over the alternate output route toward the destination node before other nodes on the network receive information that the data packets cannot be transferred between the at least one of the nodes and the next successive node.

11. The method of claim 1 wherein the data packets cannot be forwarded to the next successive node over the link because of a link failure.

12. The method of claim 1 wherein the data packets cannot be forwarded to the next successive node over the link because of a node failure.

13. The method of claim 1 wherein the information initiates a recovery operation at at least one updating node on the network.

14. The method of claim 13 wherein the recovery operation comprises updating a routing table for the at least one updating node.

15. The method of claim 13 wherein the recovery operation comprises updating a virtual circuit route that includes the at least one updating node.

16. The method of claim 13 wherein the recovery operations at the plurality of updating nodes are synchronized.

17. The method of claim 1 wherein the at least one node of the network is capable of operating in both a connectionless environment and a connection-oriented environment.

18. The method of claim 1 wherein at least a portion of the network operates in a connectionless configuration.

19. The method of claim 1 wherein at least a portion of the network operates in a connection-oriented configuration.

20. The method of claim 1 wherein the network comprises at least a portion of the Internet.

21. The method of claim 1 wherein the network comprises at least a portion of an intranet.

22. The method of claim 1 wherein the network comprises at least a portion of an extranet.

23. An apparatus for recovering from failures on a network having a plurality of nodes coupled by links over which data packets can be transferred between the nodes, each of the plurality of nodes storing information that associates links out of the node with destination nodes to which the data packets can be transferred such that the node can forward the data packets out of the node over a link to a next successive node toward an associated destination node, said apparatus comprising:

means for generating and storing, for at least one of the nodes, an alternate output route out of the node such that, in the event that the data packets to be transferred toward a destination node cannot be forwarded to the next successive node over the link associated with the destination node, the at least one of the nodes can forward the data packets over the alternate output route toward the destination node;

means for forwarding the data packets over the alternate output route toward the destination node after generating and storing the alternate output route, if the data packets to be transferred toward a destination node cannot be forwarded to the next successive node over the link associated with the destination node; and means for providing to other nodes on the network after the data packets are forwarded over the alternate output route toward the destination node, information that the data packets cannot be transferred between the at least one of the nodes and the next successive node;

characterized in that the data packets to be transferred are embedded in virtual packets addressed for the alternate route, and then sent, and further characterized in that the information that the data packets cannot be transferred between the at least one of the nodes and the next successive node includes a time at which nodes receiving the information should perform a recovery operation such that the recovery operations at the a plurality of nodes on the network are synchronized.

24. The apparatus of claim 23 wherein the alternate output route is a connectionless route.

25. The apparatus of claim 23 wherein the alternate output route is a connection-oriented route.

26. The apparatus of claim 23 wherein the data packets are forwarded over the alternate output route toward the destination node before other nodes on the network receive information that the data cannot be transferred between the at least one of the nodes and the next successive node.

27. The apparatus of claim 23 wherein the data packets cannot be forwarded to the next successive node over the link because of a link failure.

28. The apparatus of claim 23 wherein the data packets cannot be forwarded to the next successive node over the link because of a node failure.

29. The apparatus of claim 23 wherein the network comprises at least a portion of the Internet.

30. The apparatus of claim 23 wherein the network comprises at least a portion of an intranet.

31. The apparatus of claim 23 wherein the network comprises at least a portion of an extranet.

* * * * *